(12) United States Patent
Eldar et al.

(10) Patent No.: US 10,097,793 B2
(45) Date of Patent: Oct. 9, 2018

(54) METHOD AND SYSTEM OF DEPTH DATA FILLING OF SHADOWS FOR IMAGE PROCESSING

(71) Applicant: INTEL CORPORATION, Santa Clara, CA (US)

(72) Inventors: Avigdor Eldar, Jerusalem (IL); Noam Teomim, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 15/210,802

(22) Filed: Jul. 14, 2016

(65) Prior Publication Data

US 2018/0020188 A1 Jan. 18, 2018

(51) Int. Cl.
| | |
|---|---|
| *G06T 7/507* | (2017.01) |
| *H04N 7/15* | (2006.01) |
| *G06T 7/00* | (2017.01) |
| *G06T 7/60* | (2017.01) |
| *G01C 3/08* | (2006.01) |

(52) U.S. Cl.
CPC .............. *H04N 7/15* (2013.01); *G01C 3/08* (2013.01); *G06T 7/0024* (2013.01); *G06T 7/0051* (2013.01); *G06T 7/0079* (2013.01); *G06T 7/60* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 2004/0212725 | A1* | 10/2004 | Raskar | G06T 15/02 348/370 |
| 2012/0120185 | A1* | 5/2012 | Zhao | H04N 7/144 348/14.16 |
| 2015/0279042 | A1* | 10/2015 | Michot | G06T 5/005 382/154 |
| 2017/0178351 | A1* | 6/2017 | Kerbiriou | G06T 7/50 |

OTHER PUBLICATIONS

Deng, T.—"Kinect Shadow Detection and Classification"—IEEE 2013, pp. 708-713.*

* cited by examiner

*Primary Examiner* — Bernard Krasnic
(74) *Attorney, Agent, or Firm* — Green, Howard & Mughal LLP.

(57) ABSTRACT

Techniques described herein are related to a system, medium, and method of depth data filling of shadows for image processing comprising obtaining a location of at least one gap of missing depth data on pixel image data of at least one image, calculating a shadow band length corresponding to a size and position of the gap on the image, and calculated by using, at least in part, background and foreground depth values, and providing depth values of multiple pixel locations extending along the shadow band length.

22 Claims, 13 Drawing Sheets

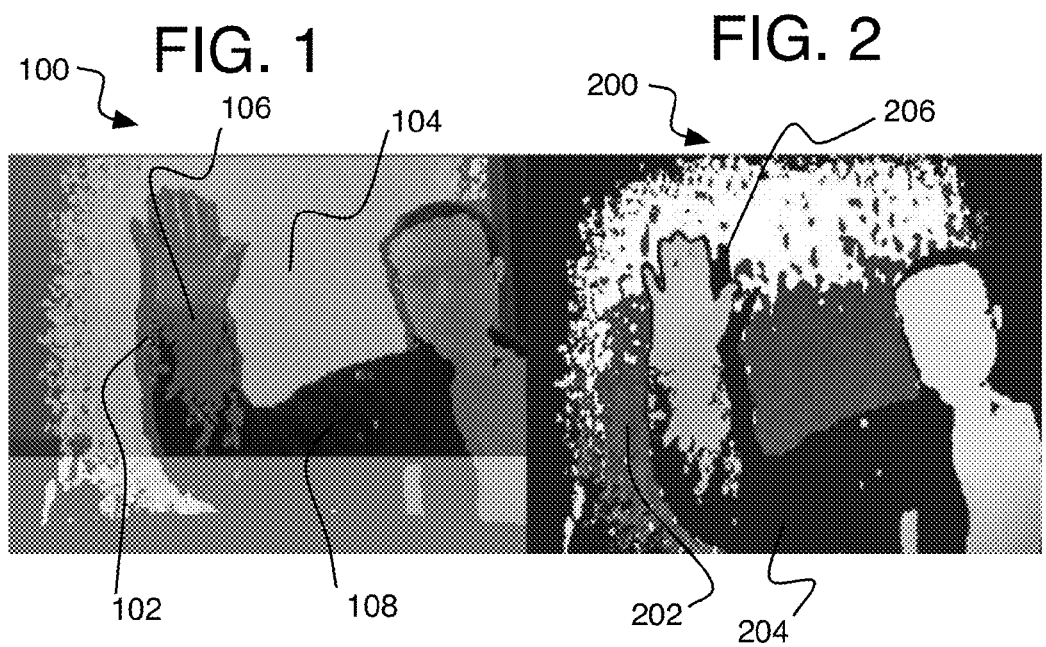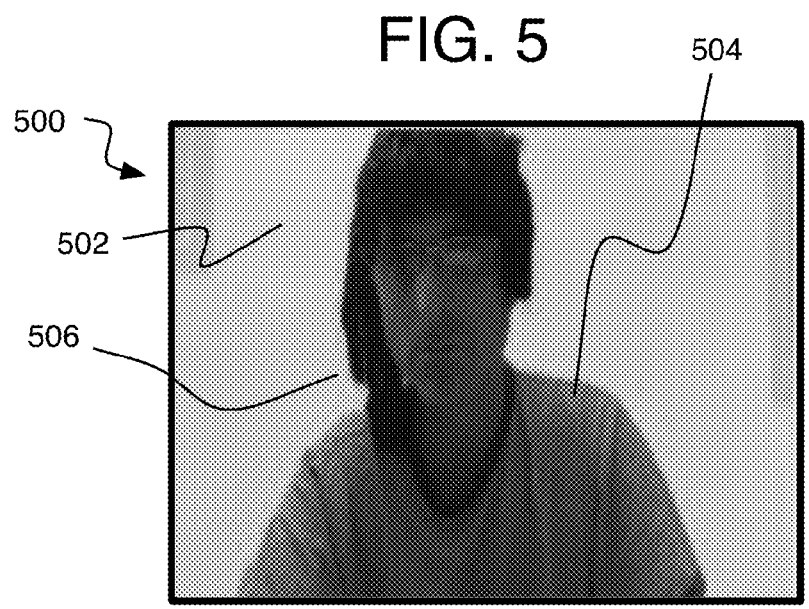

FIG. 6
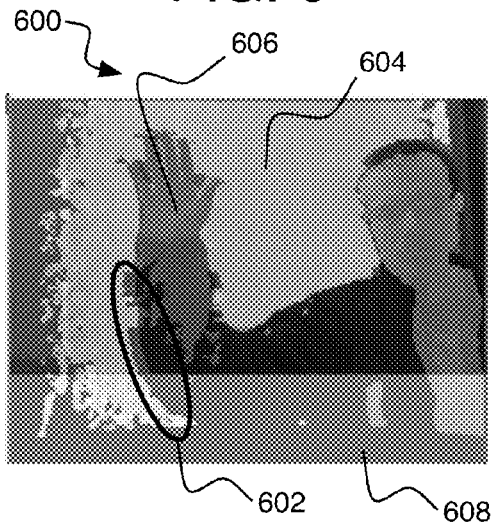
FIG. 7
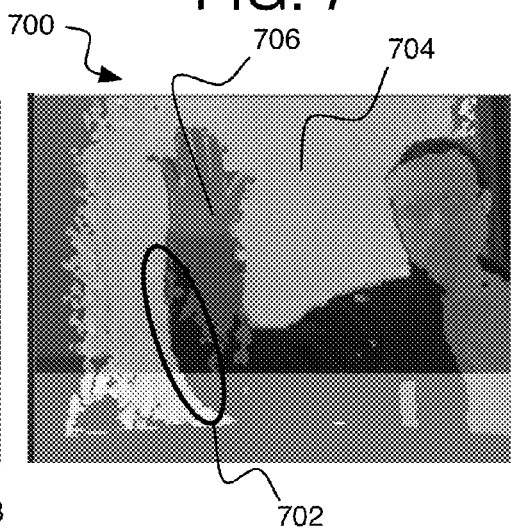
FIG. 8
| OBTAIN A LOCATION OF AT LEAST ONE GAP OF MISSING DEPTH DATA ON PIXEL IMAGA DATA OF AT LEAST ONE IMAGE 802 |
|---|
| CALCULATE A SHADOW BAND LENGTH CORRESPONDING TO A SIZE AND POSITION OF THE GAP ON THE IMAGE, AND CALCULATED BY USING, AT LEAST IN PART, BACKGROUND AND FOREGROUND DEPTH VALUES 804 |
| PROVIDE DEPTH VALUES OF MULTIPLE PIXEL LOCATIONS EXTENDING ALONG THE SHADOW BAND LENGTH 806 |

METHOD AND SYSTEM OF DEPTH DATA FILLING OF SHADOWS FOR IMAGE PROCESSING

BACKGROUND

When an image or scene is captured on a camera or provided on some other electronic device or computer as a digital image, it can be desirable to modify the image in ways that require the device to first segment the foreground of the image from the background. For example, a user may want to change the background in the image for entertainment reasons, practical reasons such as to replace the background of a person speaking in a video conference to provide a background more appropriate or less distracting for business purposes, or artistic reasons. The background-foreground segmentation also may be used for computer vision, object recognition, medical imaging, video coding efficiency, and other reasons. Depending on the application and type of camera used to capture the images, three-dimensional data in the form of depth maps may be used to generate the segmentation and establish a three-dimensional space for the image and to be used by other applications.

Often times the segmentation that uses three dimensional data may result in shadows formed near the border between the segments that is missing depth data and may include distortions and artifacts as well as discoloration that may result in objects entirely hidden within the shadows that should be visible if a scene of real objects was viewed by a person in the real world. This may be caused by a number of reasons. First, the perspective of an image may be shifted from the perspective used to form depth values for an original image, and may first be formed from the RGB pixel values. Depth values are then warped (depth to color warping) onto the RGB image, and are not always applied correctly so that shadow areas without depth data may be formed on such an image. Otherwise, areas of a scene may not be in the visible line of sight from one of two cameras in a 3D stereo camera system, or either the sensor or projector in an IR projection system. Also, very dark texture areas absorb IR commonly emitted from a depth projector. In these three cases, shadow areas with no depth data may be developed. The conventional solution is to fill the shadow areas with the background depth values, but this is often inaccurate when the correct depth value cannot be determined, and it does not reveal objects or texture that may be hidden in the shadows.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a segmented image showing a shadow caused by depth to color warping;

FIG. 2 is raw depth image showing a shadow caused by a region not visible to one camera in a stereo camera pair;

FIG. 5 is an image segmented into background and foreground with shadows filled in with background depth data;

FIG. 6 is a segmented image showing a shadow area without depth data filling;

FIG. 7 is a segmented image with a shadow filled by the implementations described herein;

FIG. 8 is a flow chart of a method of depth data filling of shadows for image processing in accordance with the implementations herein;

DETAILED DESCRIPTION

Figure 3:
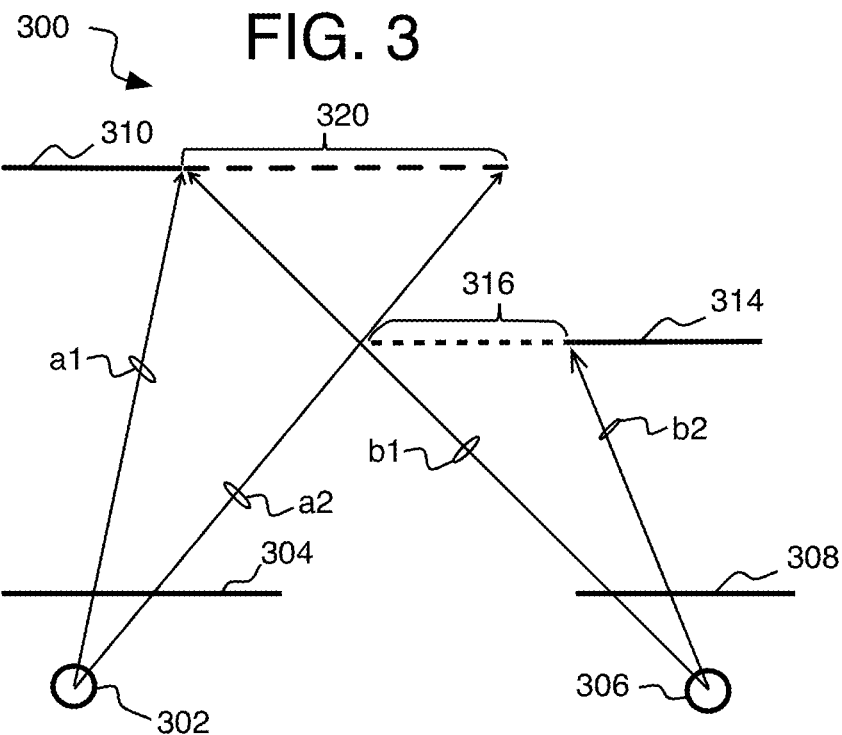
FIG. 3 is a schematic top view diagram showing the formation of a shadow due to line of sight blocked at a source depth camera nearer to a foreground side of a scene.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, Articles, and Methods of Depth Data Filling of Shadows for Image Processing.

As mentioned above, it can be desirable to segment the foreground of an image from the background whether for entertainment, practical reasons such as to replace the background of a person speaking in a video conference to provide a background more appropriate or less distracting for business purposes, or for augmenting one of the objects for artistic reasons. The background-foreground segmentation also may be used for computer vision, object recognition, medical imaging, video coding efficiency, and others. For any of these examples, once a 3D space is formed for an image, the perspective of the objects of the image can be changed using the segmentation.

Such operations may be performed with RGBD type cameras. Two main systems for generating a depth map may include stereo camera systems that use two cameras, each with its own sensor, and that use triangulation to common points to compute pixel depth values. Another system that may be used is referred to herein as an IR projection system, where a projector projects an IR pattern onto a scene, and the position of the pattern is detected by a sensor. The depth can be determined by the positions of points in the pattern. The stereo cameras or projection and sensor are in addition to a color RGB camera aligned with the depth devices, and that can also be used as a depth camera sensor.

Referring to FIG. 1, shadows can be formed that have no depth data on an area of the image. This can occur as shown on image 100 when a perspective for an image is changed or shifted. When the image is formed, the color image may be formed first. Then, depth data is warped onto the color image. Errors in the depth data warping including areas on an image where the depth data is not visible to a camera, may result in a shadow region without depth data. This often occurs near mixed regions at the boundary of adjacent segments in the image. Image 100 shows a foreground 106 (the person waving) segmented in front of a background 104 with a resulting depth to color warp shadow 102 on the left side of the person's arm. A dark region 108 of IR absorbing texture also may have gaps missing depth data when a projector system is being used.

Referring to FIG. 2, an image 200 of raw depth data shows a background 202 segmented from a foreground 204 for example, and has a shadow 206 formed on the right side of the foreground (arm) where the shadow area is not visible to one of the cameras in a stereo camera pair or the projector in an IR projection system.

Referring to FIG. 3, diagram 300 is provided to explain how the shadow or gaps with no depth data are created when one of the cameras is blocked. A source depth camera or projector 306 is on the right of a target color camera 302 for example, where the circles represent the focal point, and the rays a1, a2, and b1, b2 represent the line of sight for the cameras (note the use of the term cameras herein can generally represent sensor, projector, etc. depending on the context). The camera 302 has a sensor 304 at a focal length from the focal point, and the camera 306 has a sensor 308 a focal length from its focal point. As understood, the sensors 304 and 308 are shown in front of the focal points in the diagrams herein to simplify the diagrams but are actually placed behind the focal points at the focal length.

The cameras 302 and 306 are facing a scene with a background 310 and a foreground object 314 which blocks a part of the view of the background from the camera 306. As shown, a shadow portion 320 of the background 310 cannot be seen by camera 306 due to the foreground portion 316. Since the background shadow portion 320 has no depth data, the system cannot tell if this area should be in the background or foreground resulting in a shadow 320 forming even though camera 302 can see both of these areas.

Figure 4:
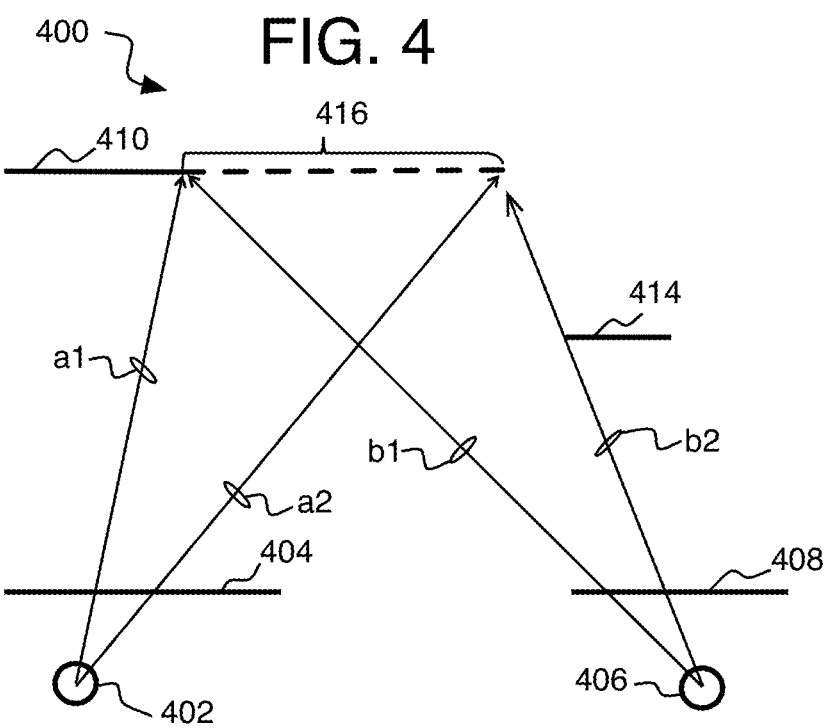
FIG. 4 is a schematic top view diagram showing the formation of a shadow due texture at the background in a scene.

Referring to FIG. 4, as shown on diagram 400, the same results occur when the shadow is caused by other reasons such as IR absorbing texture at the background 410. Thus, a target camera or sensor 402 and a camera or projector 406 both have clear sight to a portion 416 on a background 410. The portion 416 still may be a shadow portion when depth data is missing from this portion. This shows the shadow estimation is robust in the sense that it is not possible for a foreground object to project to the shadowed background region no matter which camera the blocking foreground object is in front of so that the visible parts of the background cannot be blocked by a foreground.

Referring to FIGS. 5-7, one conventional solution is to fill the shadow in with a uniform background depth. Image 500 shows a background 502 around a foreground person 504, and a filled in (or depth warped) shadow area 506 formed by a background mask, which provides poor quality around the foreground boundary.

Referring to FIG. 6, known methods will scan the image horizontally and assess whether a "no depth" gap is due to a shadow or other reasons. This may include determining whether the adjacent unwarped segments are in proximity to each other, such as 1-2 pixels apart in the RGB image data, and if so, are properly filled with depth data from one of the segments. When the unwarped segments are farther apart and a mixed region is causing a shadow area of no depth data, it is difficult to determine the cause of the shadow or mixed region. Thus, when the mixed regions are relatively large, the shadows are not typically filled with depth data. Here, for visualization purposes, image 600 shows a wide shadow area 602 filled with a default largest background depth values (such as about 200 cm) as with background area 608, and on the left side of a foreground 606. In other words, it could be that no actual depth filling as the term is meant herein took place. The lighter background area 604 (about 90 cm) should have been used instead to fill the shadow 602.

Another problem that occurs when shadow filling is leakage of depth values of a foreground into the shadow area instead of the correct depth values from background for example. The incorrect foreground values are used as filler background values when the foreground values are very close to background values.

To resolve these issues, the present method and system provides a way to infer depth data for shadows, and by one form, for shadows in proximity to segmented object boundaries to provide a good quality image. To accomplish this, an equation is used that sets the correct shadow band width, here referred to as the shadow band length since the equation may set values for a single row or column, and does not rely solely on a finding of pixels without depth data to set this length for such a band or gap. An initial gap without depth values is determined, and depth values at the start and end of the gap, along a row of pixels for example, are used to determine a background and foreground depth to be used in the equation. Otherwise, both general calibration data such as the translation distance between two cameras forming the image, and image specific calibration data, such as the focal length used to form the image, are also used in the equation. These, however, may be the only variables in the equation which makes the setting of the shadow band length very efficient and can be implemented as part of a simple scanline approach.

Also, the translation distance used in the equation may be determined in a way that considers the source of the shadow, whether depth to color warping or blocked stereo camera or projector, as well as the camera setup (which camera or sensor is right, middle, and left in a three image capture device system) thereby increasing the accuracy of the depth values. Also, the foreground value may be refined to limit leaking and increase accuracy as well by comparing the left and right end depth values of a gap to a maximum foreground depth value found in foreground object(s) in the image. A refined foreground depth value is the second largest depth among the three values. This refined foreground depth value is then used in the shadow band length equation. Many details are provided below. The image 700 (FIG. 7) shows a properly filled shadow area 702 on a foreground 706 and background 704 performed by using the method herein that limits the leaking and fills the shadow with the correct depth values.

Referring to FIG. 8, process 800 is provided for a method and system of depth data filling of shadows for image processing. In the illustrated implementation, process 800 may include one or more operations, functions, or actions 802 to 806 numbered evenly. By way of non-limiting example, process 800 may be described herein with reference to example image capture processing system 1600 of FIG. 16, and where relevant.

Process 800 may include "obtain a location of at least one gap of missing depth data on pixel image data of at least one image" 802. As explained below, this may include obtaining raw data of pixels and in a color space (such as RGB, YUV, and so forth) or other camera sensor spaces such as heat, 1-D LIDAR, or MM cameras to name a few examples, that may be calibrated with a depth camera, and pre-processing raw image data sufficient for generating a 3D space. 3D processing may be applied and may include rectification, feature matching, and final depth calculations to generate a depth map or the depth image. The depth image represents a 3D space that may have been formed from multiple images of the same scene whether from one camera or multiple cameras, and whether taken at the same time instant or different times (typically when the scene does not move). The result is a depth image or depth map with z values or otherwise where the content of each pixel has three dimensional (x, y, z) coordinates.

This operation also includes detection of gaps in the image that do not have depth data. This may be a raster or linescan type of search of the depth map of the image or other such data field that includes the depth data for the pixels in the image. The start pixel location and end pixel location is noted for each gap (or the last location with a depth value before the gap and the first pixel location with a depth value after the gap). Each gap may be one single horizontal or vertical line of pixels but could include more lines or other shapes or extend in other directions. The details are provided below.

The process 800 also may include "calculate a shadow band length corresponding to a size and position of the gap on the image, and calculated by using, at least in part, background and foreground depth values" 804. This operation may include using the depth values at the ends of the gap as the background and foreground values, and by one form along the same line (row, column, or other) that forms the gap. By other alternatives, the background and foreground depth values may be formed by combining certain depth values such as those within a certain pixel distance or pattern relative to the ends of the gap, and may be determined as a mean or other combination value. The foreground value may be refined to limit leaking by comparing the end values to a maximum foreground depth value on foreground object(s) in the image. Thus, the image may have been previously segmented in this case.

The equation may merely use the background and foreground depth values, the focal length used to capture the image, and the translation distance between cameras forming the shadow on the image. By one form, the shadow band length is set as proportional to the real world gap and uses an equation based on proportional triangles, the positions of the cameras forming the image, and the depth values to determine the proper shadow band length. The equation also may factor in whether a shadow is caused by depth to color warping or a blocked line of sight from a stereo or IR projection system. The translation distance between cameras is adjusted accordingly and is determine by comparing the gap end depth values and either knowing or determining the left to right camera arrangement among the color camera, a target sensor or depth camera, and a source projector or depth camera. The details are provided below.

Process 800 then may include "provide depth values of multiple pixel locations extending along the shadow band length" 806. Thus, the value determined to be a maximum background value between the two gap end depth values (including any refinement to avoid leaking) may be set as the depth value for multiple or each pixel location along the shadow depth length. By one form, the shadow band length extends from the left end of the gap when the shadow is likely to be on the left side of the foreground and caused by depth to color warping, and extends from the right end of the gap when the shadow is likely to be on the right side of the foreground and caused by an object blocking one of the cameras forming the shadow. These configurations are true as long as the target sensor (or camera) is on the left of the depth cameras (or IR projection system). This may be repeated for each horizontal line of pixels with a gap, but many other variations are contemplated, such as using columns instead of rows of pixels or any other linear orientation (such as diagonal) that may be efficient. Also, a number of lines may be analyzed together and a combined background or foreground value (such as a mean) may be used for the lines, or some other interpolated value could be used to name a few examples.

Figure 9A:
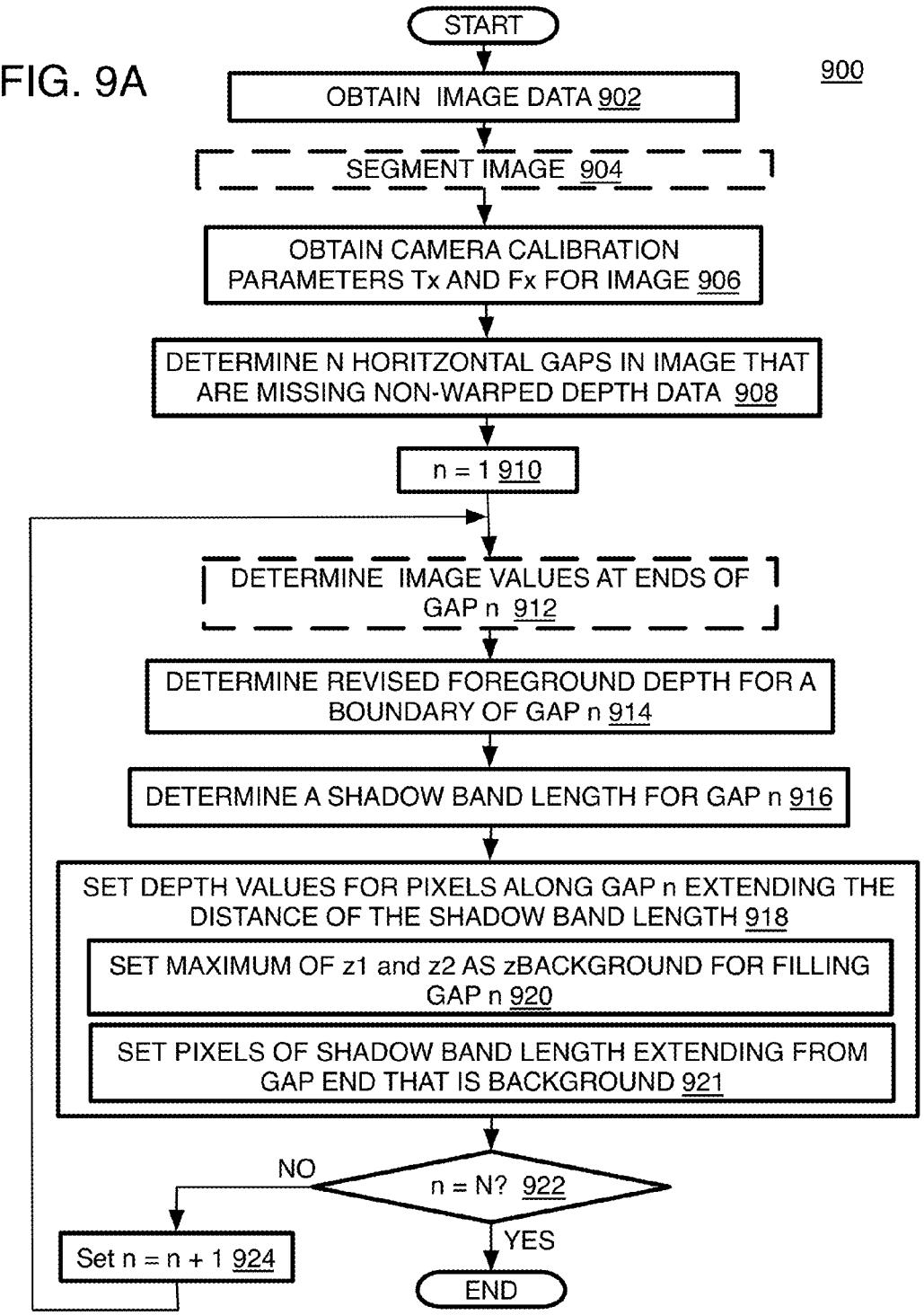
FIG. 9A is a detailed flow chart of a method of depth data filling of shadows for image processing in accordance with the implementations herein.

Referring to FIG. 9A, a process 900 is provided for a method and system of depth data filling of shadows for image processing. In the illustrated implementation, process 900 may include one or more operations, functions or actions 902 to 924 numbered evenly. By way of non-limiting example, process 900 may be described herein with reference to example image processing system 1600 of FIG. 16, and where relevant.

Process 900 may include "obtain image data" 902. This operation may include obtaining pre-processed raw image data with RGB, YUV, or other color space values in addition to luminance values for at least one image such as with still photographs or a series of images such as with a video sequence. The color and luminance values may be provided in many different additional forms such as gradients, and so forth. The pre-processing could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

This operation also may include obtaining depth data of the image(s). As mentioned herein, depth image data may be determined by a stereo camera system that captures images of the same scene from multiple angles, and this may include use of the color (RGB) camera sensor as well. The system may perform an initial rectification operation on the multiple images before the features in the different images are then matched. Triangulation algorithms, or other equivalents, may be used to determine a 3D space for the scene in the image and the depth dimension for each point, pixel, or feature in the image. Otherwise, other ways to determine three dimensions from a single camera are possible such as time-of-flight, and structural or coded light technologies. A table or depth map of z depth values for each pixel value (or the formation of 3D (x, y, z) coordinates) for the content at each pixel or for a block or other group of pixels (determined by upsampling algorithms for example) forms the depth image data.

The process 900 then may include "segment image" 904. This may include obtaining the location of at least one boundary or boundary box on an image, which establishes the area of the image to be segmented. The boundary may be established manually by a user or automatically. For example, a user may place the boundary on the image by writing it on a touch sensitive screen or otherwise by manipulating a cursor or by other devices with a display screen. By another form, a system may automatically set the boundary for segmentation such as for applications with a certain purpose such as a face detection application, and so forth. By yet other forms, the boundary may be omitted altogether especially for automatic processes that perform the segmentation for computer vision or video coding efficiency and so forth that will segment the entire image.

By some examples, the system performing the processes herein may use settings based on the assumption that the outer boundary (or a bounding box) will be set so that the largest object in the boundary is to be part of the foreground mask. This is typical when attempting to use a person or group of people as the foreground, or an image of a certain single object such as car.

The segmentation also may include operations such as planar detection, and then segmentation may be performed by color-based algorithms. Otherwise, approaches for RGBD-based segmentation typically tend to extend color only algorithms by adding an additional channel for depth data. For instance, the conventional background-foreground segmentation uses a weighted combination of the color and depth data of the pixels to determine whether the pixels are part of the background or the foreground. These methods may include a graph cut approach that is extended by creating node weights based on both RGB and depth. Other alternative methods may perform initial component and initial segmentation operations for a rough segmentation. By one example, the rough segmentation is performed with depth data, and the boundary between segments is refined by using color or luminance data in algorithms such as Active Contour and Grab cut.

It will be appreciated that by other alternatives, the methods herein may work when the image has not been entirely segmented or when segmentation has not been performed into distinct background and foreground objects at all, as long as a depth value at a pixel location at a deeper end of the gap may be considered to be a background depth value, and a depth value of a pixel location at the shallower end of the gap may be considered to be a foreground depth value (or background and foreground designations are assigned when the depth values are the same).

Figure 9B:
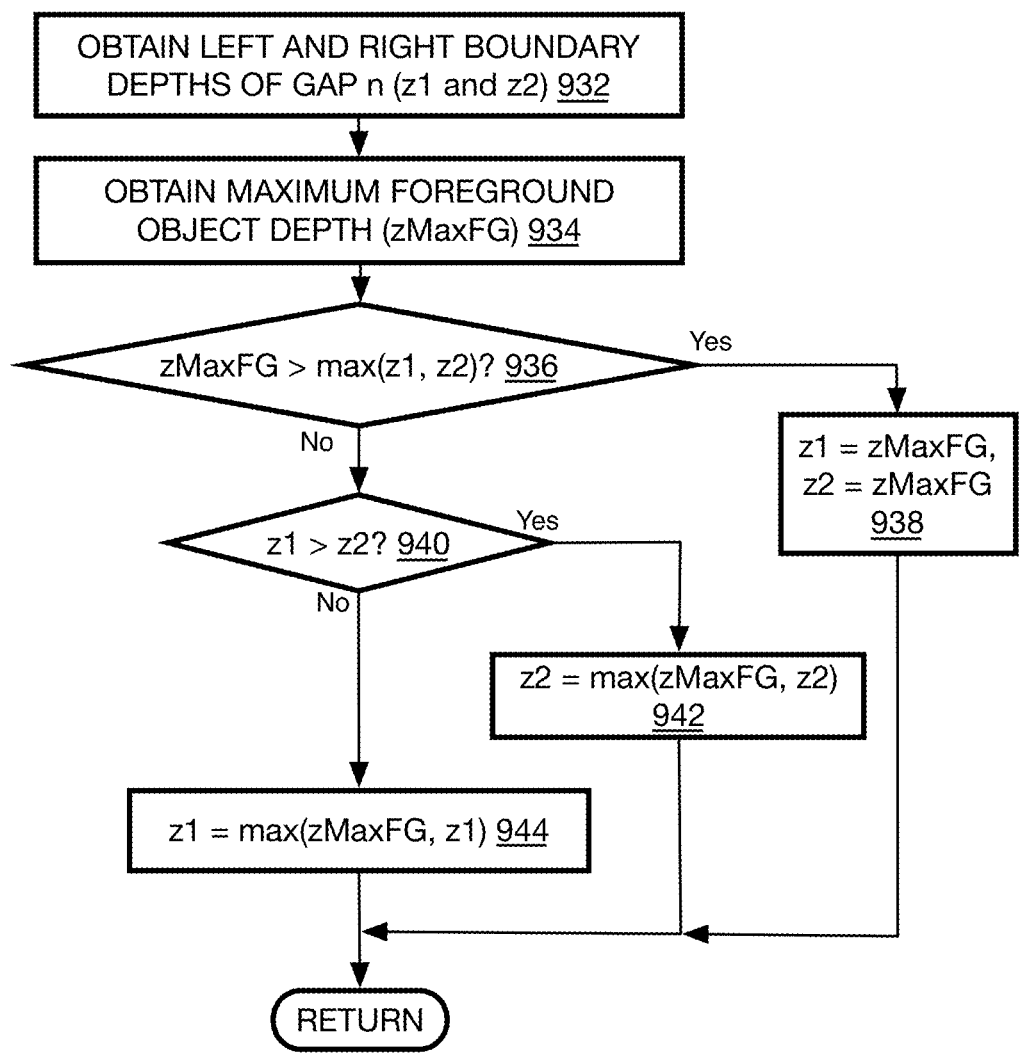
FIG. 9B is a detailed flow chart that is a part of the method of depth data filling of shadows for image processing of FIG. 9A in accordance with the implementations herein.
Figure 9C:
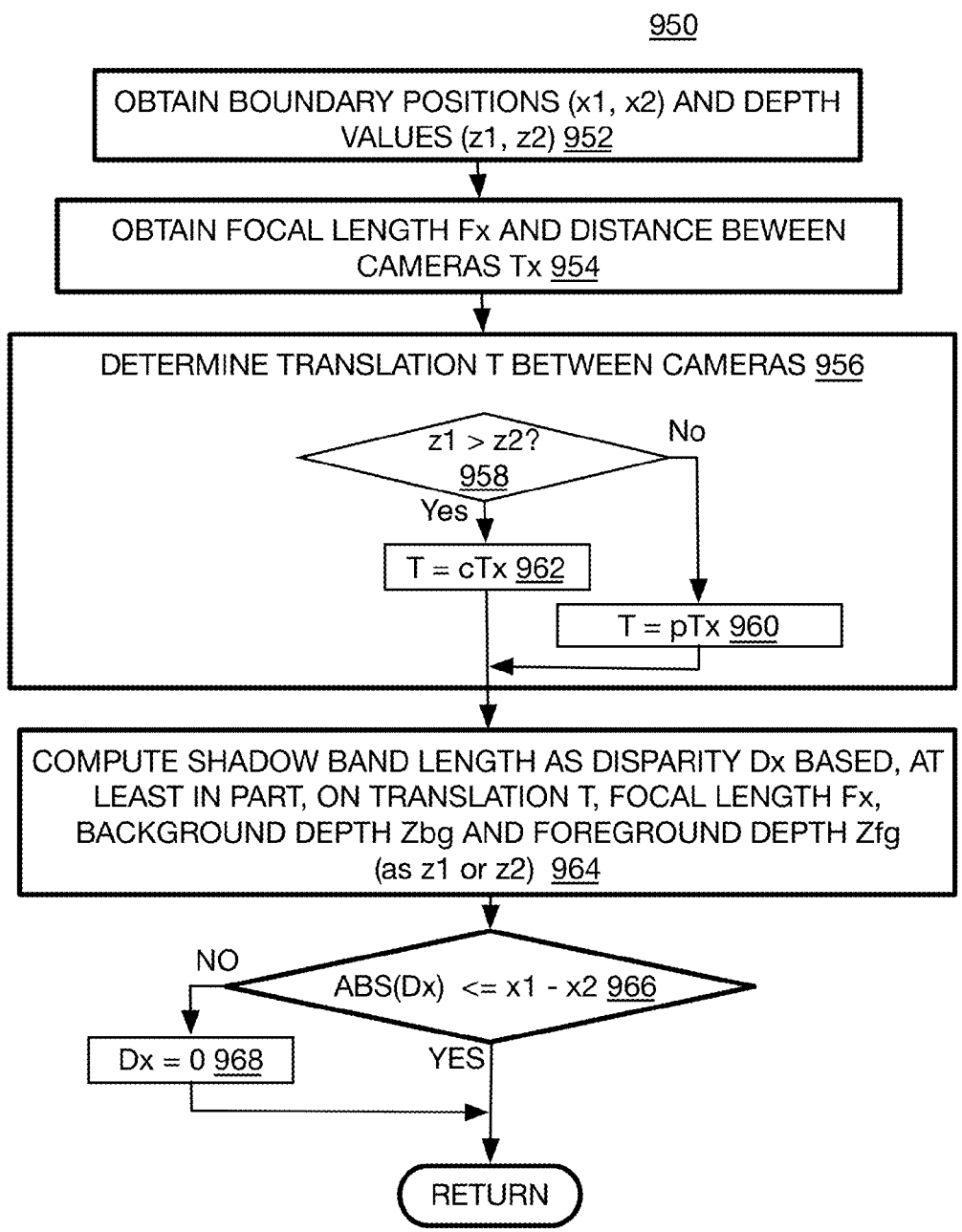
FIG. 9C is a detailed flow chart that is part of the method of depth data filling of shadows for image processing of FIG. 9A in accordance with the implementations herein.
Figure 10:
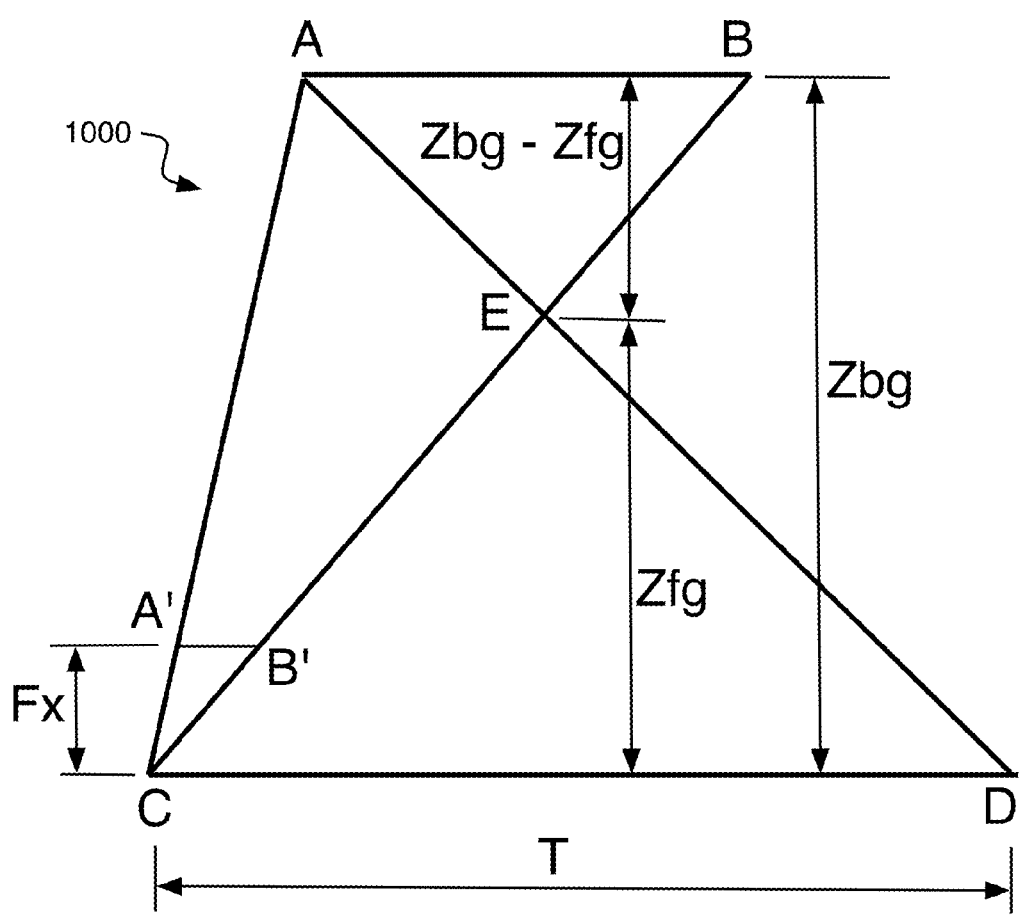
FIG. 10 is a schematic top view diagram showing camera and scene locations used to form an equation to determine a shadow band length according to the implementations herein.

Referring to FIG. 10, many of the operations of processes 900, 930 (FIG. 9B), and 950 (FIG. 9C) involve the computation of the shadow band length and refer to components of the equation used to compute the shadow band length. The development of the equation is explained as follows:

In general a shadow segment in a warped depth image can be computed by estimating a 2D disparity vector:

$$\overrightarrow{\Delta uv} = uv(x,y,z_0) - uv(x,y,z_1) \tag{1}$$

where uv is the image warping function based on camera calibration information and (x, y) are the pixel coordinates in the un-warped depth image plane. Other details are provided by OpenCV: http://docs.opencv.org/3.1.0/d9/d0c/group_calib3d.html#ga1019495a2c8d1743-ed5cc23fa0daff8c; and http://docs.opencv.org/3.1.0/d9/d0c/group_calib3d.html#ga1bc-1152bd57d63bc524204f21fde6e023d.

As explained above, the shadow effect is due to the translation distance between cameras. The translation part of the map (also known as a rectified image plane) can be factored out:

$$uv = uv'' * uvRect \quad (2)$$

where uv' is the remaining rotation and lens distortion operations, and uvRect is the rectified image. In practice, the impact of uv' on a shadow band is minute so that the result need only be applied on a fully warped image. Alternatively, warping can be performed in two steps: first, shadow filling is applied to a rectified image, and second, uv' warping is applied.

For uvRect, computation of a disparity is explained while referring to top view diagram 1000 (FIG. 10). Point C is the focal point of a target sensor (such as an RGB color camera or depth camera or IR sensor in a projection system) and point D is a focal point of a source camera (either a depth camera or IR projector). T is the translation distance between the two cameras, and as explained below is determined from Tx defined below. A gap or shadow AB in real-world dimensions in a scene in front of the cameras is parallel to T, and a background depth $Z_{bg}$ is the perpendicular distance from T to AB. E is the intersection of the ray CB from the target camera and foreground in the image (as well as the intersection of ray DA from the source camera). Thus, the perpendicular distance from E to T is the foreground depth $Z_{fg}$, and the difference between the foreground depth and the background depth is $(Z_{fg}-Z_{bg})$ and is the perpendicular distance from E to AB. The focal length component in the (depth z) direction and from the focal point C to the sensor is a focal length component Fx. The disparity A'B' being determined is located at the sensor or end of the focal length Fx. With this arrangement, the computation of the disparity (or shadow band length) can be determined using proportional triangle equations as follows:

Since, $$\Delta ABE \sim \Delta DCE \quad (3)$$

then, $$AB = \frac{Z_{bg} - Z_{fg}}{Z_{fg}} * T \quad (4)$$

Since, $$\Delta CA'B' \sim \Delta CAB \quad (5)$$

then, $$A'B' = \frac{AB \cdot Fx}{Z_{bg}} \quad (6)$$

Then substituting equation (4) into equation (6) for AB, the equation for computing the shadow band length is:

$$A'B' = T * Fx * \left( \frac{1}{Z_{fg}} - \frac{1}{Z_{bg}} \right) \quad (7)$$

Accordingly, the process 900 may include "obtain camera calibration parameters Tx and Fx for image" 906, where Fx is defined above, and Tx includes the translation distances between cameras that may be needed to compute the shadow band length. Particularly, T is determined from Tx, which as explained below may be cTx which is the color to depth camera translation distance along a horizontal axis in the diagrams referred to herein for example (and to the farther of the two depth cameras in a stereo pair of depth cameras for example). Also, pTx is the translation distance from the color camera to the projector (or second (or closer) camera in a stereo camera pair) along the horizontal axis in the present examples where the three devices are aligned along a line parallel to the horizontal axis. Thus, it also can be stated that pTx is the difference between cTx and the distance between the pair of stereo cameras (or distance between projector and sensor). As explained below, whether T is related to the cTx or pTx, may depend on whether the shadow is on the left side or right side of a foreground object. The details are provided below with the determination of T.

Process 900 may include "determine N horizontal gaps in image that are missing non-warped depth data" 908, and then may include set "n=1" 910. These are added as a gap counter for the image being analyzed. Thus, for simplicity sake, the process is described as proceeding gap by gap, and by one form the gaps may be analyzed in a certain order such as in scanline or raster order across a screen, or may be analyzed top to bottom and shadow by shadow when each gap is a single row of pixels for example. Other variations may include providing the shadow band lengths operation by operation over multiple or all gaps in an image. Thus, for example, after all gaps are detected, then all foreground depth value revisions are provided for multiple gaps, and then the translation T is determined for all gaps, and so forth. It will be understood that many variations are possible.

It also will be understood that by one form, there are no size limitations of the gap, and the gap may span from 1 pixel an entire span of a display screen as long as background and foreground depth values can be developed.

Process 900 may include "determine image values at ends of gap n" 912, thus once gap 1 is detected, or all gaps are detected, the depth value (z1) and horizontal left position (x1) of the pixel location on the left end (herein referred to as the start end) is noted. The depth value z2 and horizontal right position x2 are also noted at the pixel location adjacent the right end of the gap. The ends of the gaps may be referred to herein as gap boundaries as well. As mentioned, the examples herein provide each gap with a single linear horizontal row of pixels on the image, but other arrangements could be made including gaps that extend in different directions or have a different shape than a single straight line of pixels. The direction of the gap corresponds to the direction of the translation distance vector cTx of the two cameras. Thus, if the cameras are both arranged along a line at some angle (like 45 degrees) relative to an image sensor, then the gaps are also scanned at 45 degrees on the image. Also, some combination of rows or columns could be grouped together to form a single gap (such as over 8 rows), and all of the left end depth values z1 may be grouped to form a single mean depth value and so forth. Many variations are possible.

Process 900 then may include "determine revised foreground depth for a boundary of gap n" 914. Also as mentioned above, a refined foreground depth value may be provided to limit leaking from adjacent foreground depths that should not be used in a particular shadow.

Figure 11:
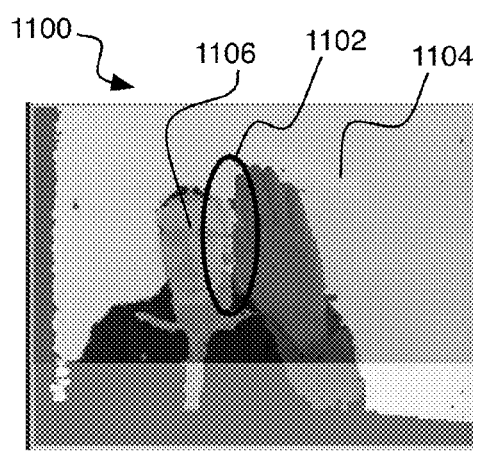
FIG. 11 is an image showing foreground leakage into a shadow filled according to the methods herein without refining the foreground value.

Referring to FIG. 11, and specifically, another problem that occurs is leaking, and as shown on image 1100, where depth values of a foreground 1106 leak into the shadow area, such as shadow area 1102 on image 1100, instead of the correct depth values from background 1104. The incorrect foreground values may be used as filler background values when the foreground values are very close to background values, and the system could not differentiate which depth value to use. It may have chosen the facial depth values since they were very close in proximity to the shadow area (left to right on the RGB image).

To resolve these issues, and while referring to FIG. 9B, a process 930 is provided for refining a foreground depth value for a method of depth data filling of shadows for image processing. In the illustrated implementation, process 900 may include one or more operations, functions or actions 932 to 944 numbered evenly. By way of non-limiting example, process 930 may be described herein with reference to example image processing system 1600 of FIG. 16, and where relevant.

Also, it will be understood that while this process 930 is generally referred to as refinement of the foreground depth value of a gap, in fact both the background and foreground depth values may be set and/or modified.

Process 930 may include "obtain left and right boundary depths of gap n (z1 and z2)" 932, and continuing the example, obtaining the z1 (zleft) and z2 (zright) depth values of the gap 1. These are the same values obtained and noted (or stored in memory) above while detecting the gaps.

Process 930 may include "obtain maximum foreground object depth (zMaxFG)" 934. Here, this operation may assume that the image has been segmented, at least roughly, into foreground objects and at least one background. The zMaxFG may be the foreground depth on a foreground object that is the maximum depth value on that object. The foreground object may be any image object that does not have the largest (or background) depth in the image. This xMaxFG value may be a value for an entire image, or may be considered a local foreground value near or adjacent the gap that is being analyzed. This may be different from image to image depending on the content of the image such that very busy images with numerous objects may use a local maximum foreground value while an image with very few objects may use an image-wide foreground maximum depth value. Many variations are contemplated including for images that were not segmented but nevertheless have a depth value considered a maximum foreground depth value.

Figure 14:
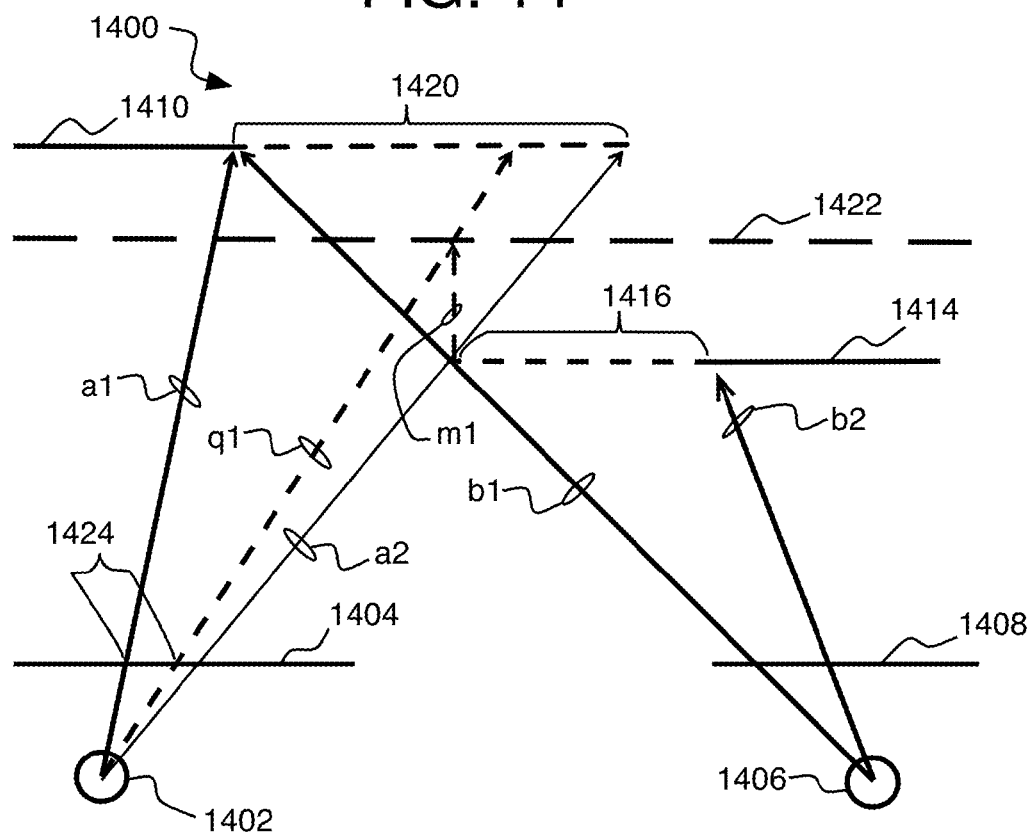
FIG. 14 is a schematic top view diagram showing camera and scene locations used to determine a refined foreground depth value according to the implementations herein.

Referring to FIG. 14, a top view diagram is provided to explain the foreground refinement, and is a diagram similar to diagram 400 (FIG. 4) such that similar features are numbered similarly and named similarly, and need not be re-described here. The difference here on diagram 1400 is the addition of a maximum foreground depth 1422 and a projection m1 of an end of the foreground 1414 to the maximum depth value 1422, and a ray q1 from the target camera intersecting the end of the foreground 1414 (which is not visible to the source camera 1406) and to the background 1410 thereby defining an edge of the shadow 1420. The use of the refined foreground depth value at the maximum foreground depth value can help to differentiate the foreground from the background to avoid leaking of the wrong background or foreground depth values into the shadow.

Figure 12:
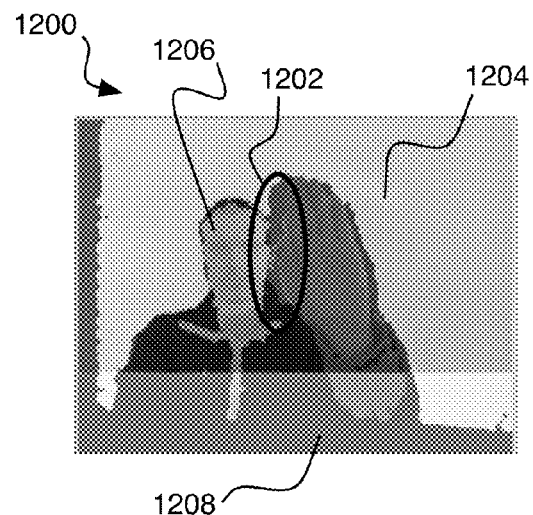
FIG. 12 is an image showing foreground leakage is reduced by using a refined foreground depth value.

Thus, the setting of z1 and z2 to modify the foreground depth value (and set the background depth value when necessary) to limit leakage is as follows:

Referring to FIG. 12, process 930 may include a query whether "zMaxFG>max(z1, z2)?" 936, and establishes whether zMaxFG is larger than both ends of the gap. If so, process 930 may include "z1=zMaxFG, z2=zMaxFG" 938 to set the zMaxFG as both the foreground and background values for the gap. By setting both z1 and z2 with the same value, the computed disparity will be 0, and thus, no shadow filling will be performed. This corresponds to the case where both edges of the gap belong to a foreground entity, which limits potential leakage. For example, an image 1200 (FIG. 12) shows the application of the present methods using the disparity and by refining the foreground depth value as explained here and to fill the shadow area 1202 between foreground objects 1206 (the head and arm), and in front of a background 1204 that has two different depths (one is shown darker at area 1208 than the other at area 1204). In this case, depth to color warping may have been performed and resulted in the shadow 1202. As mentioned, in this scenario, no depth filling occurred because the hand (foreground) depth value is replaced by the refined foreground value, which is the value of the face in the foreground. Since both values of background and foreground are now the same, the computed disparity is zero, and no filling is applied. The far background depth value shown in the shadow 1202 is simply the default value. It is noted that the refinement worked since the leaking of the face is significantly reduced.

If zMaxFG is smaller than z1 or z2 or both, process 930 continues with a query "z1>z2" 940. Here, if so, z1 is the background depth value for the gap, and z2 will be the refined foreground depth value. The process 930 may then set "z2=max(zMaxFG, z2)" 942 to set z2 as the next or second largest depth value among the three depth values. Thus whichever is larger, zMaxFG or the original z2 depth value, is now set as the z2 refined foreground depth value going forward.

If z1 is not greater than z2, then z2 is the background depth value, and z1 will be set as the refined foreground depth value. In this case, process 930 may include "z1=max (zMaxFG, z1)" 944, as with z2 in the prior operation to set z1 here with the second largest depth value among the three available depth values.

Figure 13:
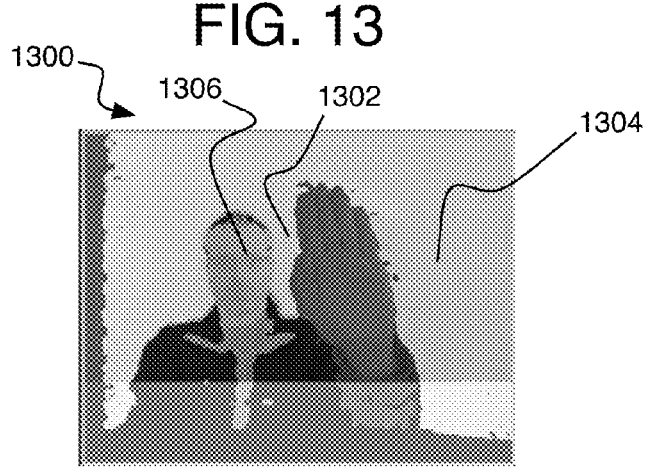
FIG. 13 is an image showing a balance between foreground depth value refinement and shadow filling according to the implementations herein.

Referring to FIG. 13 and returning to FIG. 14, the process provided herein to differentiate the different available depths to clearly select which are the foreground depths to be used in computing the shadow band length is applied in image 1300 (FIG. 13) wherein a foreground 1306 in front of a background 1304 has a properly filled shadow area 1302 with the lighter (and relatively closer) background depth versus the darker farthest background depth. This was accomplished by using the arrangement on diagram 1400. It also will be understood that the use of the maximum foreground depth value will shorten the shadow band length 1424 at the sensor (or focal length end) of the target camera so that it extends from ray a1 to ray q1 rather than to ray a2. This represents the tradeoff between fully filling the shadow and limiting leakage from the foreground. The closer the maximum foreground is set closer to the background, the less leakage will occur, but the shorter the shadow band length will be. The shorter the shadow band length, less of the shadow area will be filled. Thus, as shown on image 1300, the face leakage is limited, and the proper background depth fills the shadow area 1302, but a small band of unfilled area (next to the hand) still exists due to this compromise. Thus, by one alternative, it will be understood that an iteration type of process could be implemented to find the best balance between leakage avoidance and shadow filling if desired.

Returning to process 900 (FIG. 9A) once the gap end depth values z1 and z2 are set, process 900 may include "determine a shadow band length for gap n" 916. For this operation, and while referring to FIG. 9C, a process 950 is provided for determining a shadow band length for a method of depth data filling of shadows for image processing. In the illustrated implementation, process 950 may include one or more operations, functions or actions 952 to 968 numbered evenly. By way of non-limiting example, process 950 may be described herein with reference to example image processing system 1600 of FIG. 16, and where relevant.

Process 950 may include "obtain boundary positions (x1, x2) and depth values (z1, z2)" 952, and as described above and refined by the foreground refinement process 930.

Process 950 may include "obtain focal length Fx and distance between cameras Tx" 954, as already described above for operation 906 and repeated here merely to indicate that these values may be used now.

Process 950 then may include "determine translation T between cameras" 956, and as mentioned, this operation is provided to try to factor in the source of the shadow (whether depth to color warping or blockage of line of sight of a camera forming the shadow) and adjusting the length of T accordingly. When the shadow is caused by blockage of a stereo camera or IR projection device, T is only dependent on the depth calibration data (such as focal length) and the distance between the cameras applying the function represented as T=cTx 962, where one of the cameras may be a color camera. When the shadow is caused by depth to color warping, T is dependent on the depth calibration data and the distance between the cameras, but also takes into account the calibration (distance) between the depth camera and the color camera. Combining the depth calibration data and the calibration data between the color and depth cameras sums up to a mathematical expression that depends on the camera distance (Tx) applied as T=pTx 960, where, by one example, pTx equals the difference between cTx and the distance between the stereo camera pair (or IR projector and sensor). The source of the shadow generally can be determined by observing whether the shadow is on the left side (more likely depth to color warping) or right side (more likely blockage) of the foreground. This also depends on the arrangement of the three camera devices from left to right. The left and right indication of shadow source here is correct when the target color camera is on the left, and the two stereo depth cameras (or both IR projector devices) are on the right. The opposite would be true (left and right shadow source indications would switch) when the target color camera is on the right instead.

The camera arrangement is determined by the sign of Tx. In some systems, Tx will be positive extending from the color camera, which means that the color camera is on the right of the depth camera. Likewise, Tx will be negative extending from the color camera, which means that the color depth is on the right of the color camera.

In the present example (FIG. 6 and FIG. 7 for example), the target color camera is on the left so that Tx is positive. Thus, left side shadow indicates depth to color warping and a right side shadow is likely to indicate a blockage.

This operation may include "z1>z2?" 958, and where z1 is on the left and z2 is on the right (according to the camera adjustment assumption mentioned above). Thus, if so, this tends to indicate the left side of the gap is in background while the right side of the gap is in the foreground, thereby indicating the shadow is on the left side of the foreground likely caused by depth to color warping, and the opposite would be likely be true when z1 is not greater than z2 (unless they are even in which case it is a flat area).

When z1 is greater than z2, this operation may include "T=pTx" 960, which are both defined above. When z1 is not greater than z2, this operation may include "T=cTx" 962.

Now that T, z1 and z2 are set, the system can compute the shadow band length for gap 1.

Process 950 may include "compute shadow band length as disparity Dx based, at least in part, on translation T, focal length Fx, background depth $Z_{bg}$ and foreground depth $Z_{fg}$ (as z1 or z2)" 964, where $Z_{bg}$=z1 or z2, whichever is the background depth value, while $Z_{fg}$ is the other of z1 and z2 whichever is the refined foreground depth value. The shadow depth length A'B'=Dx.

The four variables are then inserted into equation (7) recited above to compute the shadow band length Dx. The resulting length Dx may be longer or shorter than the pixel length between x1 and x2 of the gap. The shadow band length should be shorter than the depth length in most cases. When it is determined that the shadow depth length is longer than the gap length, this is often due to outlier depth speckles and noise that can undesirably and visibly affect the process. To avoid this, process 950 may include a query "ABS(Dx) ≤x1−x2" 966, and if not, the process proceeds with the computed Dx as the shadow band length. If so, however, now process 950 may include "Dx=0" 968 so that the process may continue analyzing the gap except now the shadow band length is zero so that no depth values are added to the gap in this case. Otherwise, the process proceeds as usual and will loop to obtain the next gap for filling.

When the Dx is smaller than or equal to the gap length, the operations return to process 900 (FIG. 9A). Process 900 may include "set depth values for pixels along gap n extending the distance of the shadow band length" 918. This may include first "set maximum z1 and z2 as zBackground for filling gap n" 920. Thus, the maximum depth value between the depth values z1 and z2 at the ends of the gap x1 (xLeft) and x2 (xRight) respectively at the ends of the gap is set as the background depth value for filling on the shadow band length.

This operation also then includes "set pixels of shadow band length extending from gap end that is background" 921. This refers to starting the shadow band length at the end of the gap with the greater depth value and working pixel by pixel inward along the gap until the end of the shadow band length. Each or multiple pixels are provided with the background depth value of that background end whether it is z1 at xLeft, or z2 at xRight. Specifically, when the z1 (at xLeft) depth is larger, then the shadow band extends from xleft, to xLeft+Dx, but when the z2 (at xRight) depth is larger, then the shadow band extends from xRight−Dx to xRight. Other variations could be used such as centering the shadow band length in the gap or providing it from the foreground end instead.

It will also be appreciated that in some cases not every pixel along the shadow depth length is provided a depth value when the depth map for the image is some down-sampling of all of the image data so that depth values are provided at some interval such as every other pixel, every $8^{th}$ pixel, every 8×8 block, and so forth. In these cases, the filling of the shadow with depth data may match the resolution of the depth map for that image.

Process 900 then may include a query "n=N?" 922 to determine if the last gap on the image was reached. If so, the process is ended for this image, and the now filled in shadow and depth map of the image may be provided to other applications for further 3D processes. If not, the process 900 may continue to include "set n=n+1" 924, and the process loops to operation 912 to being analyzing the data of the next gap.

Figure 15:
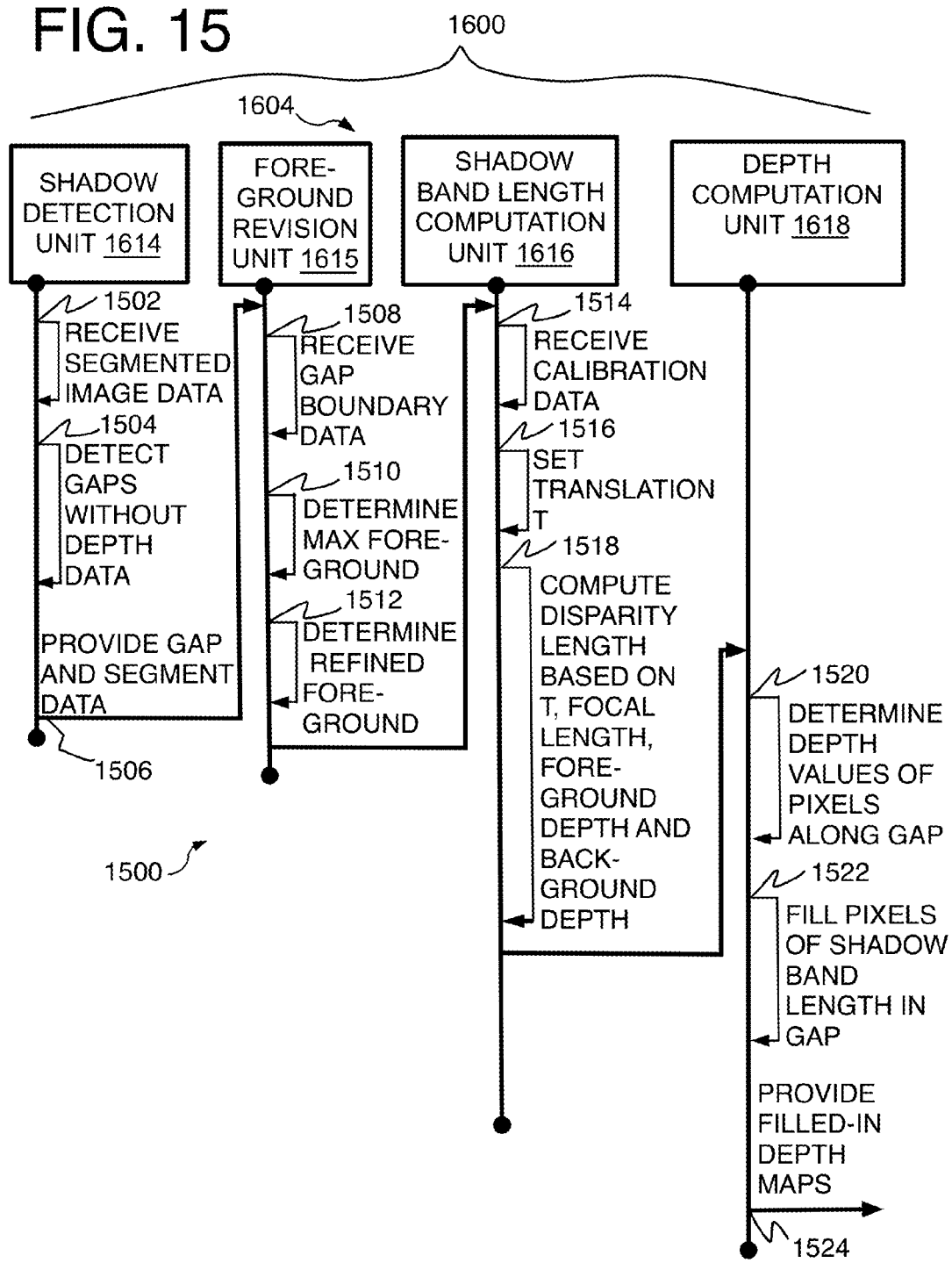
FIG. 15 is a schematic diagram to show a system performing depth data filling of shadows for image processing in operation in accordance with the implementations herein.

Referring to FIG. 15, process 1500 illustrates the operation of a sample image processing system 1600 for depth data filling of shadows for image processing in accordance with at least some implementations of the present disclosure. In more detail, in the illustrated form, process 1500 may include one or more operations, functions or actions as illustrated by one or more of actions 1502 to 1524 numbered evenly. By way of non-limiting example, process 1500 will be described herein with reference to FIG. 16. Specifically, system 1600 includes logic units or modules 1604. The logic modules 1604 relevant here may include a shadow filling unit 1613 that includes a shadow detection unit 1614, a foreground revision unit 1615, a shadow band length computation unit 1616, and a depth computation unit 1618. The operation of the system may proceed as follows.

Process 1500 may include "receive segmented image data" 1502, and as described above with processes 800 and 900, where the raw image data has already been pre-processed, and the content of the image analyzed to provide 3D coordinates for each of, or blocks of, the pixel points to form a depth image. It will be understood that when the images are frames in a video sequence for any of the processes mentioned herein may apply to each image formed for each frame or other time period, and when multiple cameras are used, the depth image may be associated with, or representing, a three-dimensional space formed from multiple images of the same scene (which may or may not capture the scene at the same time instance).

The image data also may be obtained in segmented form where one or more foreground objects are identified and differentiated from one background segment with the largest depth value(s), and by processes already mentioned above. Each segment may have a combined or single or uniform depth value or may have a range of depth values.

Process 1500 may include "detect gaps without depth data" 1504, and as mentioned above, a depth map of the image or other image data fields with depth data may be scanned to determine which pixel locations are missing depth data that should have depth data. The pixel locations missing depth data may be organized into single line, such as a horizontal line, of pixels with a position and depth value adjacent a left end or start of the gap and a position and depth value for a pixel location adjacent the right end of the gap. The gap may have a minimum and/or maximum size as well. Other details are provided elsewhere herein.

Process 1500 may include "provide gap and segment data" 1506. Thus, the system may provide the gap definitions (by start and end pixel data) as well as the segment data including a representative and/or maximum foreground depth value for each foreground object in the image that is not the farthest (or deepest) background depth.

Process 1500 may include "receive gap boundary data" 1508. This operation includes obtaining the left and right (or z1 and z2) depth values for a gap being analyzed.

Process 1500 may include "determine max foreground boundary" 1510. As also described above, a maximum foreground value to be used with a particular gap is determined by analyzing foreground objects identified by a segmentation operation. The maximum foreground depth value of either a single foreground on an image may be selected, whether the object has a single depth value or a range of depth values. Also, a single maximum foreground depth value may be selected for an entire image or for a local area of an image near or adjacent the gap being analyzed when many foreground objects are provided in an image for example. The selection of the maximum foreground depth value may be selected to reduce leaking from adjacent foreground depths that should not be used in a shadow.

Process 1500 may include "determine refined foreground" 1512. This may include comparing the left and right depth values of the gap (z1 and z2 for example) to the maximum foreground depth value to be used with a particular gap. The refined foreground depth value selected for z1 or z2 is then selected as whichever of the three values (z1, z2, or maximum foreground depth value) is the second largest depth value when z1 or z2 is larger than the maximum foreground depth value to establish a clear background depth value. When both z1 and z2 are smaller than the maximum foreground depth value, the maximum foreground depth value is set as both z1 and z2 in situations where both ends of the gap are in the foreground and are set equal to limit leakage as described above.

Process 1500 then may include "receive calibration data" 1514, and as described in detail above, receiving the focal length component Fx at the target sensor involved with forming the shadow, and the cTx and pTx transition distance values that are the distances between the color camera and the depth camera, and the distance between stereo cameras or projection IR devices, respectively.

Process 1500 may include "set translation T" 1516, and also as explained above, by determining whether the shadow is on the left or right of the foreground object, and when the color camera is on the left of the other two cameras or devices, then using cTx=T when the shadow is on the right of the foreground object, and using pTx when the shadow is on the left of the foreground object. This is switched when the color camera is on the right of the other two cameras.

Process 1500 may include "compute disparity length based on T, focal length, foreground depth, and background depth" 1518. Thus, the T, Fx, larger of z1 and z2 as the background depth, and the smaller of z1 and z2 as the foreground depth are inserted into equation (7) recited above to compute a shadow band length Dx (or A'B'). As mentioned, the equation (7) is based on proportional triangles and specifically the proportion of the real-world gap size to the disparity or shadow band length in pixel distance.

Process 1500 may include "determine depth values of pixels along gap" 1520, and by one example mentioned above, the greater depth at the end of the gap (z1 or z2) is selected as the background depth value to be used to fill the gap. A local background value, when multiple backgrounds are presented in different areas of an image could be used as well.

Process 1500 may include "determine depth values of pixels along gap" 1522, and as mentioned above, the shadow band length may extend from the background or greater depth (z1 or z2) end of the gap being analyzed. The pixel locations within the shadow band length is filled pixel by pixel or by some resolution or interval to match the resolution of the depth map of the image.

Process 1500 may include "provide filled-in depth maps" 1524, and then may provide the filled in depth map with filled shadows to other applications for further image processing.

In addition, any one or more of the operations of FIGS. 8, 9A-9C, and 15 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 16:
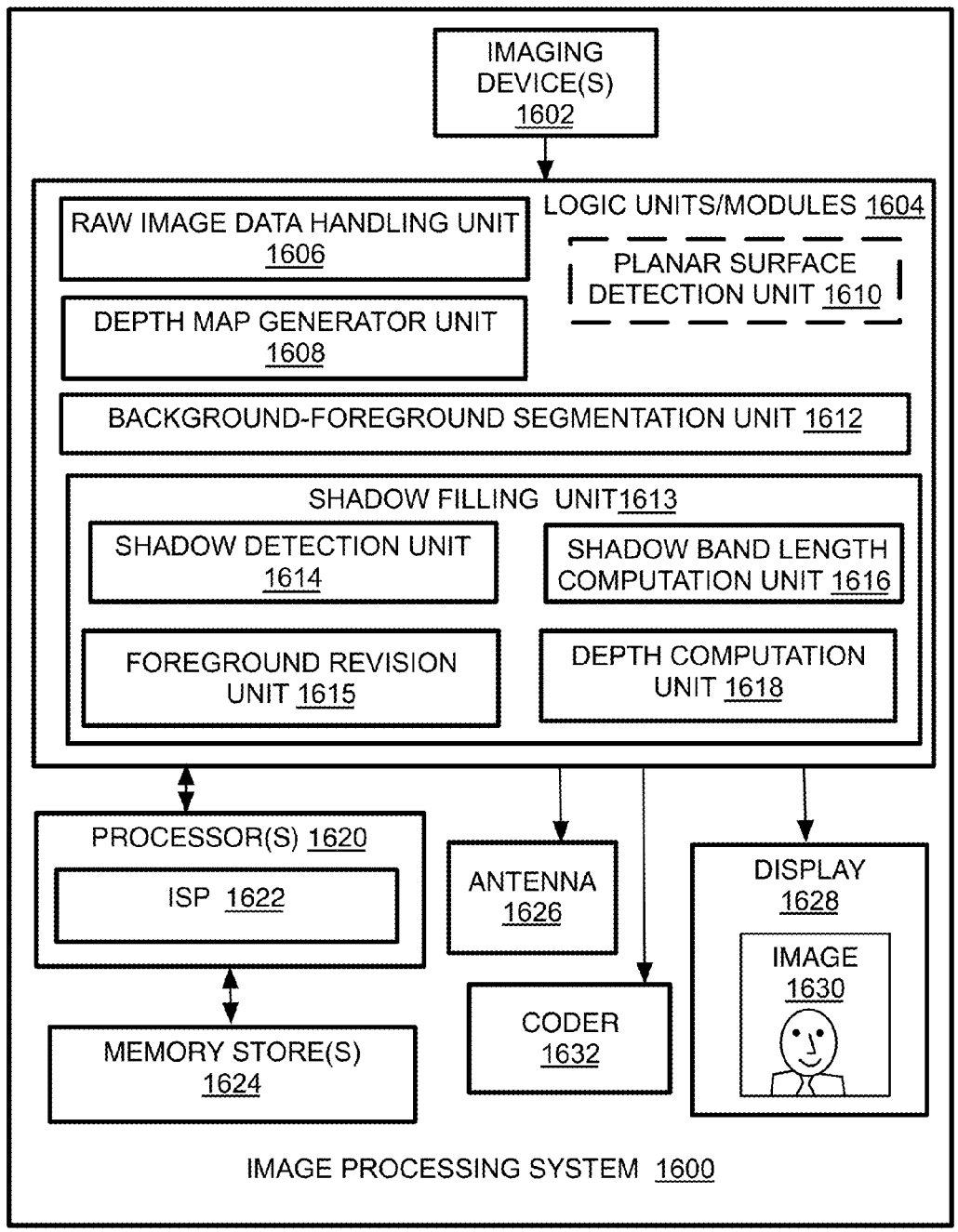
FIG. 16 is an illustrative diagram of an example system.

Referring to FIG. 16, an example image processing system 1600 is arranged in accordance with at least some implementations of the present disclosure. In various implementations, the example image processing system 1600 may have an imaging device 1602 to form or receive captured image data. This can be implemented in various ways. Thus, in one form, the image processing system 1600 may be one or more digital cameras or other image capture devices, and imaging device 1602, in this case, may be the camera hardware and camera sensor and/or projector software, module, or component. In other examples, imaging processing system 1600 may have an imaging device 1602 that includes or may be one or more cameras, and logic modules 1604 may communicate remotely with, or otherwise may be communicatively coupled to, the imaging device 1602 for further processing of the image data.

Thus, image processing system 1600 may be a single camera with a multi-camera device either of which may be a smartphone, tablet, laptop, or other mobile device. Otherwise, system 1600 may be the device with multiple cameras where the processing occurs at one of the cameras or at a separate processing location communicating with the cameras whether on-board or off of the device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1602 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1602 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1602 may be provided with an eye tracking camera.

By one form, system 1600 is an RGBD system that has a color RGB camera and either two stereo depth cameras or an IR projector and target depth camera. The camera, projector, and sensor maybe referred to as image capture devices since these devices are all involved in the capture of an image whether to capture color or depth data. The three image devices may be aligned in a single line as described above to define various translation distances between the image capture devices.

In the illustrated example and relevant here, the logic modules 1604 may include a raw image handling unit 1606 that performs pre-processing on the image data sufficient for generating a depth map or depth image, a depth map generation unit 1608 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene). The logic modules 1604 also may include a planar surface detection unit 1610 to detect the planar surfaces in the depth image so that the planes can be used as components in the segmentation.

By one example form, the logic modules also may have a background-foreground segmentation unit 1612 to set the segmentation boundary, establish initial components, merge the initial components first into larger merged components, and then into coarse depth-based background and foreground segments, fill holes using color based algorithms (or depth to color warping) and apply color-based or luminance-based segmentation at the coarse segmentation border formed by the depth data to refine the borders between the segments.

A shadow filling unit 1613 may comprise a shadow detection unit that scans the image data or depth maps for gaps missing depth data on an image. A foreground revision unit 1615 determines a revised foreground depth value to be used for shadow filling to limit leaching at the shadow. A shadow band length computation unit 1616 uses depth data and sensor (and/or camera and/or projector) calibration data to determine the band length for a gap on the image. A depth computation unit 1618 then provides the depth values for the pixels along the shadow band length to fill the shadow along a single gap. The details of the operations of these units is provided above.

The image processing system 1600 may have one or more processors 1620 which may include CPUs such as the Intel Atom or a dedicated image processing unit (IPU) or image signal processor (ISP) 1622, memory stores 1624, one or more displays 1628 to provide images 1630, a coder 1632, and antenna 1626. In one example implementation, the image processing system 1600 may have the display 1628, at least one processor 1620 communicatively coupled to the display, and at least one memory 1624 communicatively coupled to the processor. A coder 1632, which may be an encoder, decoder, or both, also may be provided. As an encoder 1632, and with antenna 1634, the encoder may be provided to compress image data for transmission to other devices that may display or store the image. It will be understood that as a decoder, the coder may receive and decode image data for processing by the system 1600. Otherwise, the processed image 1630 may be displayed on display 1628 or stored in memory 1624. As illustrated, any of these components may be capable of communication with one another and/or communication with portions of logic modules 1604 and/or imaging device 1602. Thus, processors 1620 may be communicatively coupled to both the image device 1602 and the logic modules 1604 for operating those components. By one approach, although image processing system 1600, as shown in FIG. 16, may include one particular set of blocks or actions associated with particular components or modules, these blocks or actions may be associated with different components or modules than the particular component or module illustrated here.

Figure 17:
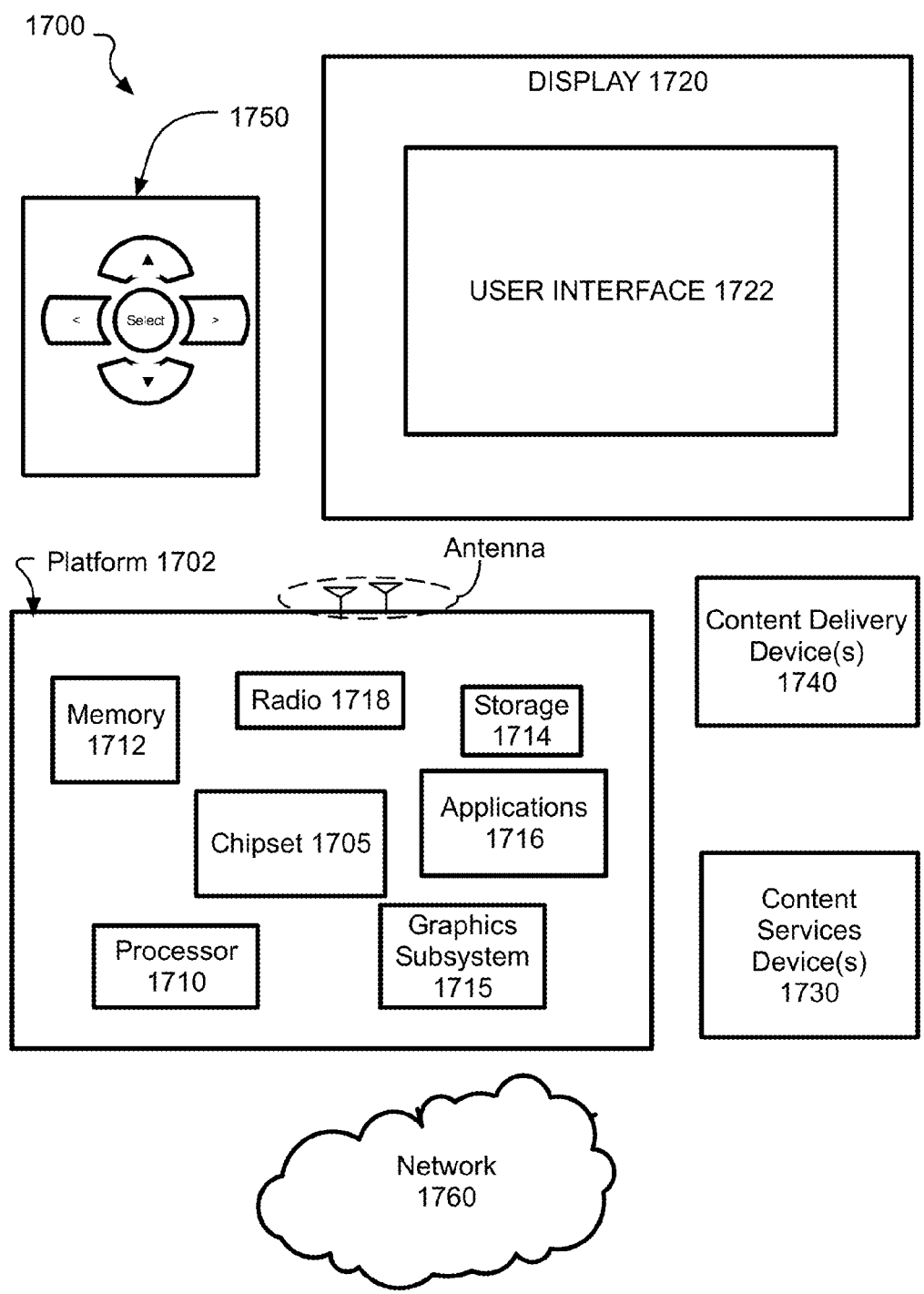
FIG. 17 is an illustrative diagram of another example system.

Referring to FIG. 17, an example system 1700 in accordance with the present disclosure operates one or more aspects of the image processing system described herein. It will be understood from the nature of the system components described below that such components may be associated with, or used to operate, certain part or parts of the image processing system 1000 described above. In various implementations, system 1700 may be a media system although system 1700 is not limited to this context. For example, system 1700 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, Display Port, wireless HDMI, and/or wireless HD compliant techniques. Graphics subsystem 1715 may be integrated into processor 1710 or chipset 1705. In some implementations, graphics subsystem 1715 may be a stand-alone card communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In implementations, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In implementations, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various implementations, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various implementations, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 17.

Figure 18:
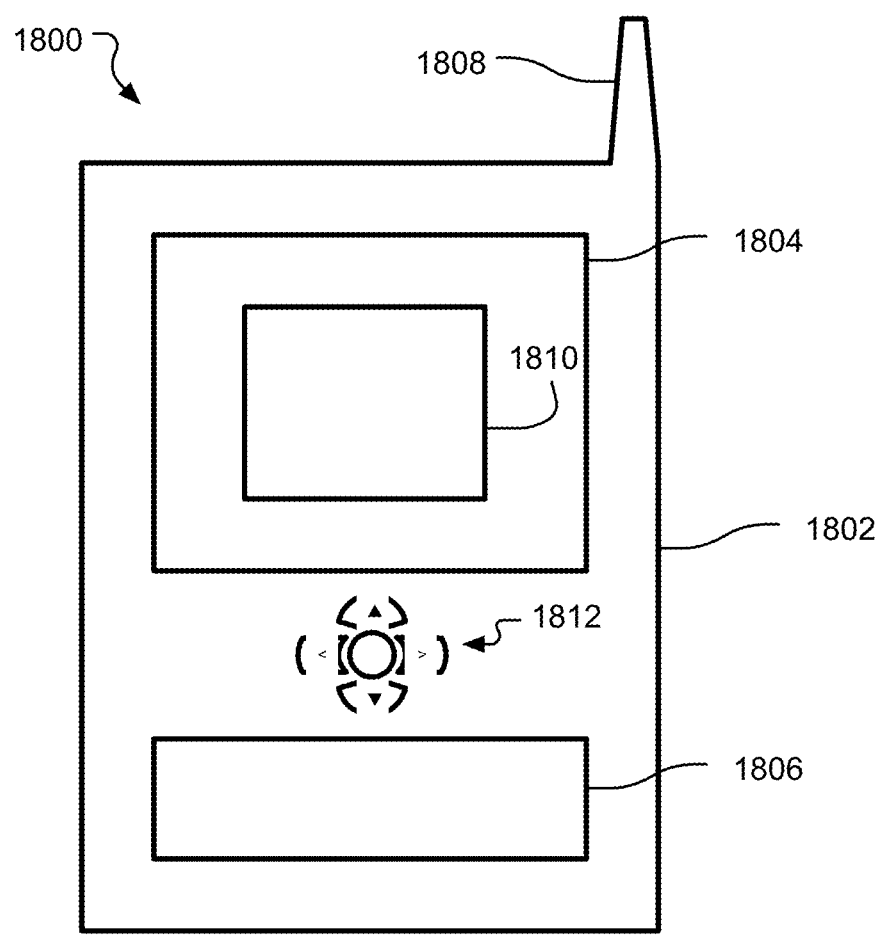
FIG. 18 illustrates another example device, all arranged in accordance with at least some implementations of the present disclosure.

Referring to FIG. 18 a small form factor device 1800 is one example of the varying physical styles or form factors in which system 1600 and/or 1700 may be embodied. By this approach, device 1800 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 18, device 1800 may include a housing 1802, a display 1804 including a screen 1810, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, and so forth. Information also may be entered into device 1800 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of depth data filling of shadows for image processing, comprises obtaining a location of at least one gap of missing depth data on pixel image data of at least one image; calculating a shadow band length corresponding to a size and position of the gap on the image, and calculated by using, at least in part, background and foreground depth values; and providing depth values of multiple pixel locations extending along the shadow band length.

By another implementation, this method may comprise determining from the other components to the first component determining the shadow band length by using an equation based on proportional triangles; determining the shadow band length by using an equation that uses the focal length at a sensor used to form the image and a translation distance between the sensor and a depth camera or depth projector used to capture the image, wherein the background and foreground depth values, the focal length and the translation distance are the only variables in the equation; wherein calculating the shadow band length factors in whether the missing depth data is likely to have been caused by (1) depth to color warping or (2) a blocked line of sight of one or more of multiple devices used to form the image, wherein the shadow band length is determined by using a translation distance between a sensor and a depth camera or projector used to form the image; wherein the translation distance is determined differently depending on whether the missing depth data is likely to have been caused by (1) depth to color warping or (2) a blocked line of sight of one or more of multiple devices used to form the image; wherein the shadow band length is determined by using a translation distance between a sensor and a depth device forming the image, wherein the translation distance is determined differently depending, at least in part, on whether the missing depth data is on a left side or a right side of a foreground object in the image; wherein the translation distance is a distance cTx between a first camera and a depth camera when the missing depth data is on a right side of the foreground object, and a translation distance pTx is the difference between cTx and a distance between a projector and sensor or two stereo pair depth cameras when the missing depth data is on a left side of the foreground object and when the cameras are aligned from left to right with a first camera, a projector or stereo depth camera, and another depth camera or sensor, and wherein the effect of left and right is switched when the camera alignment is switched left to right; wherein the camera alignment is determined by receiving the translation distance as a vector with positive direction from one camera type and toward another image capture device used to form the image.

The method also may comprise forming a revised foreground depth value to be used to determine the shadow band length and comprising comparing a maximum depth value on a foreground object on the image and to the depth values at pixel end locations near the start and end of the gap along a straight line of pixels forming the gap; and comprising at least one of: setting the revised foreground depth value equal to the second greatest depth value among the maximum depth value and the pixel end location depth values when at least one of the pixel end locations has a depth value greater than the maximum depth value, and setting the maximum depth value as the revised foreground depth value when the maximum depth value is greater than both pixel end location depth values.

By a further implementation, a computer-implemented system of depth data filling of shadows for image processing comprises at least one display; at least one memory; at least one processor communicatively coupled to the display and the memory; and a shadow filling unit operated by the processor and to operate by: obtaining a location of at least one gap of missing depth data on pixel image data of at least one image; calculating a shadow band length corresponding to a size and position of the gap on the image, and calculated by using, at least in part, background and foreground depth values; and providing depth values for multiple pixel locations extending along the shadow band length.

The system also may include that the 13 wherein the shadow filling unit is to operate by determining the shadow band length by using an equation based on proportional triangles; wherein the shadow filling unit is to operate by determining the shadow band length by using an equation that uses the focal length at a sensor used to form the image and a translation distance between the sensor and a depth camera or depth projector used to capture the image; and wherein the background and foreground depths, the focal length and the translation distance are the only variables in the equation.

The system also includes wherein the shadow filling unit is to operate by forming a revised foreground depth value to be used to determine the shadow band length and the forming comprising: comparing a maximum depth value on a foreground object on the image and to the depth values at pixel end locations adjacent the start and end of the gap along a straight line of pixels forming the gap; and at least one of: setting the revised foreground depth value equal to the second greatest depth value among the maximum depth value and the pixel end location depth values when at least one of the pixel end locations has a depth value greater than the maximum depth value, and setting the maximum depth value as the revised foreground depth value when the maximum depth value is greater than both pixel end location depth values; wherein calculating the shadow band length factors in whether the missing depth data is likely to have been caused by (1) depth to color warping or (2) a blocked line of sight of one or more of multiple image capture devices used to form the image; wherein the shadow band length is determined by using a translation distance between a sensor and a depth device forming the image, wherein the translation distance is determined differently depending, at least in part, on whether the missing depth data is on a left side or a right side of a foreground object in the image; the shadow filling unit being arranged to operate by providing individual pixel locations along the shadow band length each with a depth value equal to the background depth value associated with a pixel location adjacent a start or end of a line of pixels forming the gap; wherein the pixel location with the maximum depth is set as the background depth; wherein the shadow band length A'B' is computed by $T \times F \times (1/\text{background} - 1/\text{foreground})$ where T is a translation distance between a first camera and a depth-related camera, F is a focal length, background is the background depth and foreground is the foreground depth.

As another implementation, a computer-readable medium having stored thereon instructions that when executed cause a computing device to operate by: obtaining a location of at least one gap of missing depth data on pixel image data of at least one image; calculating a shadow band length corresponding to a size and position of the gap on the image, and calculated by using, at least in part, background and foreground depth values; and providing depth values for multiple pixel locations extending along the shadow band length.

As another option, the instructions execute the computing device to operate by: determining the shadow band length by using an equation based on proportional triangles; determining the shadow band length by using an equation that uses the focal length at a sensor used to form the image and a translation distance between the sensor and a depth camera or depth projector used to capture the image, wherein the background and foreground depths, the focal length and the translation distance are the only variables in the equation; wherein the shadow band length is determined by using a translation distance between a sensor and a depth camera or projector used to form the image, wherein the translation distance is determined differently depending on whether the missing depth data is likely to have been caused by (1) depth to color warping or (2) a blocked line of sight of one or more of multiple devices used to form the image; wherein the translation distance is determined differently depending, at least in part, on whether the missing depth data is on a left side or a right side of a foreground object in the image; and wherein the translation distance is a distance cTx between a first camera and a depth camera when the missing depth data is on a right side of the foreground object, and a translation distance pTx is the difference between cTx and a distance between a projector and sensor or two stereo pair depth cameras when the missing depth data is on a left side of the foreground object and when the cameras are aligned from left to right with a first camera, a projector or stereo depth camera, and another depth camera or sensor, and wherein the effect of left and right is switched when the camera alignment is switched left to right.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of depth data filling of shadows for image processing, comprising:
    obtaining a location of at least one gap of missing depth data on pixel image data of at least one image;
    calculating a shadow band length corresponding to a size and position of the gap on the image, and calculated by using, at least in part, background and foreground depth values;
    forming a revised foreground depth value to be used to determine the shadow band length and the forming comprising: comparing a maximum depth value on a foreground object on the image and to the depth values at pixel end locations near the start and end of the gap along a straight line of pixels forming the gap;
    setting the revised foreground depth value equal to a second greatest depth value among the maximum depth value and the pixel end location depth values when at least one of the pixel end locations has a depth value greater than the maximum depth value, and
    setting the maximum depth value as the revised foreground depth value when the maximum depth value is greater than both pixel end location depth values; and
    providing depth values of multiple pixel locations extending along the shadow band length.

2. The method of claim 1 comprising determining the shadow band length by further using an equation based on proportional triangles.

3. The method of claim 1 comprising determining the shadow band length by further using an equation that uses a focal length at a sensor used to form the image and a translation distance between the sensor and a depth camera or depth projector used to capture the image.

4. The method of claim 3 wherein the background and foreground depth values, the focal length and the translation distance are the only variables in the equation.

5. The method of claim 1 wherein calculating the shadow band length depends on whether the missing depth data is likely to have been caused by (1) depth to color warping or (2) a blocked line of sight of one or more of multiple devices used to form the image.

6. The method of claim 1 wherein the shadow band length is determined by using a translation distance between a sensor and a depth camera or projector used to form the image, wherein the translation distance is determined differently depending on whether the missing depth data is likely to have been caused by (1) depth to color warping or (2) a blocked line of sight of one or more of multiple devices used to form the image.

7. The method of claim 1 wherein the shadow band length is determined by using a translation distance between a sensor and a depth device forming the image, wherein the translation distance is determined differently depending, at least in part, on whether the missing depth data is on a left side or a right side of a foreground object in the image.

8. The method of claim 7 wherein the translation distance is a distance cTx between a first camera and a depth camera when the missing depth data is on a right side of the foreground object, and a translation distance pTx is the difference between cTx and a distance between a projector and sensor or two stereo pair depth cameras when the missing depth data is on a left side of the foreground object and when the stereo pair depth cameras are aligned from left to right with the first camera, the projector or stereo depth camera, and another depth camera or sensor, and wherein the effect of left and right is switched when the camera alignment is switched left to right.

9. The method of claim 8 wherein the camera alignment is determined by receiving the translation distance as a vector with positive direction from one camera type and toward another image capture device used to form the image.

10. The method of claim 1 comprising determining the shadow band length by further using an equation based on proportional triangles;
    determining the shadow band length by further using an equation that uses a focal length at a sensor used to form the image and a translation distance between the sensor and a depth camera or depth projector used to capture the image, wherein the background and foreground depth values, the focal length and the translation distance are the only variables in the equation;
    wherein the translation distance is determined differently depending on whether the missing depth data is likely to have been caused by (1) depth to color warping or (2) a blocked line of sight of one or more of multiple devices used to form the image;
    wherein the translation distance is determined differently also depending, at least in part, on whether the missing depth data is on a left side or a right side of a foreground object in the image;
    wherein the translation distance is a distance cTx between a first camera and a depth camera when the missing depth data is on a right side of the foreground object, and a translation distance pTx is the difference between cTx and a distance between a projector and sensor or two stereo pair depth cameras when the missing depth data is on a left side of the foreground object and when the stereo pair depth cameras are aligned from left to right with the first camera, the projector or stereo depth camera, and another depth camera or sensor, and wherein the effect of left and right is switched when the camera alignment is switched left to right.

11. A computer-implemented system of depth data filling of shadows for image processing, comprising:
    at least one display;
    at least one memory;
    at least one processor communicatively coupled to the display and the memory; and
    a shadow filling unit operated by the at least one processor and to operate by:
        obtaining a location of at least one gap of missing depth data on pixel image data of at least one image;
        calculating a shadow band length corresponding to a size and position of the gap on the image, and calculated by using, at least in part, background and foreground depth values;

forming a revised foreground depth value to be used to determine the shadow band length and the forming comprising: comparing a maximum depth value on a foreground object on the image and to the depth values at pixel end locations adjacent the start and end of the gap along a straight line of pixels forming the gap;

setting the revised foreground depth value equal to a second greatest depth value among the maximum depth value and the pixel end location depth values when at least one of the pixel end locations has a depth value greater than the maximum depth value, and setting the maximum depth value as the revised foreground depth value when the maximum depth value is greater than both pixel end location depth values; and providing depth values for multiple pixel locations extending along the shadow band length.

12. The system of claim 11 wherein the shadow filling unit is to operate by determining the shadow band length by further using an equation based on proportional triangles.

13. The system of claim 11 wherein the shadow filling unit is to operate by determining the shadow band length by further using an equation that uses a focal length at a sensor used to form the image and a translation distance between the sensor and a depth camera or depth projector used to capture the image.

14. The system of claim 13 wherein the background and foreground depth values, the focal length and the translation distance are the only variables in the equation.

15. The system of claim 11 wherein calculating the shadow band length depends on whether the missing depth data is likely to have been caused by (1) depth to color warping or (2) a blocked line of sight of one or more of multiple image capture devices used to form the image.

16. The system of claim 11 wherein the shadow band length is determined by using a translation distance between a sensor and a depth device forming the image, wherein the translation distance is determined differently depending, at least in part, on whether the missing depth data is on a left side or a right side of a foreground object in the image.

17. The system of claim 11 wherein the shadow filling unit is arranged to operate by providing individual pixel locations along the shadow band length each with a depth value equal to the background depth value associated with a pixel location adjacent a start or end of a line of pixels forming the gap.

18. The system of claim 17 wherein the pixel location with a maximum depth is set as the background depth.

19. The system of claim 11 wherein the shadow band length A'B' is computed by T×F×(1/background−1/foreground) where T is a translation distance between a first camera and a depth-related camera, F is a focal length, background is the background depth and foreground is the foreground depth.

20. The system of claim 11 wherein the shadow filling unit is to operate by determining the shadow band length by further using an equation based on proportional triangles;

wherein the shadow filling unit is to operate by determining the shadow band length by further using an equation that uses a focal length at a sensor used to form the image and a translation distance between the sensor and a depth camera or depth projector used to capture the image;

wherein the background and foreground depth values, the focal length and the translation distance are the only variables in the equation.

21. A non-transitory computer-readable medium having stored thereon instructions that when executed cause a computing device to operate by:

obtaining a location of at least one gap of missing depth data on pixel image data of at least one image;

calculating a shadow band length corresponding to a size and position of the gap on the image, and calculated by using, at least in part, background and foreground depth values;

forming a revised foreground depth value to be used to determine the shadow band length and the forming comprising: comparing a maximum depth value on a foreground object on the image and to the depth values at pixel end locations near the start and end of the gap along a straight line of pixels forming the gap;

setting the revised foreground depth value equal to a second greatest depth value among the maximum depth value and the pixel end location depth values when at least one of the pixel end locations has a depth value greater than the maximum depth value, and setting the maximum depth value as the revised foreground depth value when the maximum depth value is greater than both pixel end location depth values; and providing depth values for multiple pixel locations extending along the shadow band length.

22. The non-transitory computer-readable medium of claim 21 wherein the instructions cause the computing device to operate by:

determining the shadow band length by further using an equation based on proportional triangles;

determining the shadow band length by further using an equation that uses a focal length at a sensor used to form the image and a translation distance between the sensor and a depth camera or depth projector used to capture the image, wherein the background and foreground depth values, the focal length and the translation distance are the only variables in the equation;

wherein the translation distance is determined differently depending on whether the missing depth data is likely to have been caused by (1) depth to color warping or (2) a blocked line of sight of one or more of multiple devices used to form the image;

wherein the translation distance is determined differently also depending, at least in part, on whether the missing depth data is on a left side or a right side of a foreground object in the image; and wherein the translation distance is a distance cTx between a first camera and a depth camera when the missing depth data is on a right side of the foreground object, and a translation distance pTx is the difference between cTx and a distance between a projector and sensor or two stereo pair depth cameras when the missing depth data is on a left side of the foreground object and when the stereo pair depth cameras are aligned from left to right with the first camera, the projector or stereo depth camera, and another depth camera or sensor, and wherein the effect of left and right is switched when the camera alignment is switched left to right.

* * * * *